(12) United States Patent
Chen et al.

(10) Patent No.: US 10,266,099 B2
(45) Date of Patent: Apr. 23, 2019

(54) MAIN BODY OF AN AUTOMOTIVE WINCH AND AUTOMOTIVE WINCH FOR VEHICLE THEREOF

(71) Applicant: Ningbo Xuli Metal Products Co., Ltd., Ningbo (CN)

(72) Inventors: Weiguo Chen, Ningbo (CN); Yanqiong Chen, Ningbo (CN); Wei Deng, Ningbo (CN)

(73) Assignee: Ningbo Xuli Metal Products Co., Ltd., Ningbo (CN)

( * ) Notice: Subject to any disclaimer, the term of this patent is extended or adjusted under 35 U.S.C. 154(b) by 0 days.

(21) Appl. No.: 15/561,916

(22) PCT Filed: Nov. 30, 2016

(86) PCT No.: PCT/CN2016/000664
§ 371 (c)(1),
(2) Date: Sep. 26, 2017

(87) PCT Pub. No.: WO2018/076129
PCT Pub. Date: May 3, 2018

(65) Prior Publication Data
US 2018/0326893 A1 Nov. 15, 2018

(30) Foreign Application Priority Data
Oct. 25, 2015 (CN) .......................... 2016 1 0941463

(51) Int. Cl.
*B60P 7/08* (2006.01)
(52) U.S. Cl.
CPC ............. *B60P 7/0853* (2013.01); *B60P 7/083* (2013.01)

(58) Field of Classification Search
CPC .. B66D 1/005; B66D 1/04; B66D 1/06; B60P 7/06; B60P 7/08; B60P 7/083; B60P 7/0853; B60P 7/15
See application file for complete search history.

(56) References Cited

U.S. PATENT DOCUMENTS

| 1,710,774 A | * | 4/1929 | Kinser | B66D 1/06 254/352 |
| 2,849,089 A | * | 8/1958 | Lindmark | F16D 41/16 188/82.2 |
| 2,991,975 A | * | 7/1961 | Alexander | B60P 7/083 254/219 |

(Continued)

*Primary Examiner* — Emmanuel M Marcelo
(74) *Attorney, Agent, or Firm* — Wang Law Firm, Inc.

(57) ABSTRACT

The present invention discloses a main body of an automotive winch and automotive winch for vehicle thereof. The main body of an automotive winch comprises a main frame, a main rotating shaft and a driving shaft; a transmission assembly engages the driving shaft and the main rotating shaft, the transmission assembly comprises a small gear and a large gear; a pair of ratchet is disposed on the driving shaft; a retaining pawl engaging on the pair of ratchets is disposed on the main frame; retaining pawl spring surrounds the retaining pawl, and the retaining pawl locks the pair of ratchets when driven by the retaining pawl spring. The automotive winch of the present invention is used in accompany with a manipulating handle, and by which the lashing operation of the winch will be more convenient and safe, time-saving and less effort-consuming and the operating efficiency will be greatly improved.

9 Claims, 13 Drawing Sheets

(56) References Cited

U.S. PATENT DOCUMENTS

| | | | | |
|---|---|---|---|---|
| 3,998,429 | A * | 12/1976 | Cheung | F16H 7/08 254/218 |
| 4,309,001 | A * | 1/1982 | Ahad | B60R 22/353 242/382.1 |
| 7,845,621 | B1 * | 12/2010 | Lu | B66F 3/005 24/68 CD |
| 8,348,239 | B2 * | 1/2013 | Chou | B66F 15/00 24/68 CD |
| 8,967,595 | B2 * | 3/2015 | Chou | B25B 25/00 24/68 CD |
| 2007/0151812 | A1 * | 7/2007 | Michel | B61H 13/02 188/33 |
| 2007/0169833 | A1 * | 7/2007 | Crittenden | B65B 13/025 140/123.6 |
| 2007/0221897 | A1 * | 9/2007 | Cardona | B60P 7/0853 254/218 |
| 2009/0013656 | A1 * | 1/2009 | Nasiatka | B65B 13/025 53/582 |
| 2011/0278521 | A1 * | 11/2011 | Okerlund | B66D 3/02 254/344 |
| 2013/0140124 | A1 * | 6/2013 | Mitchell | B60P 7/083 192/43.1 |

* cited by examiner

MAIN BODY OF AN AUTOMOTIVE WINCH AND AUTOMOTIVE WINCH FOR VEHICLE THEREOF

RELATE APPLICATIONS

This application is a national phase entrance of and claims benefit to PCT Application for a main body of an automotive winch and automotive winch for vehicle thereof, PCT/CN2016/000664, filed on Nov. 30, 2016, which claims benefit to Chinese Patent Applications 201610941463.7, filed on Oct. 25, 2016. The specifications of both applications are incorporated here by this reference.

FIELD OF THE INVENTION

The present invention relates to a lashing tool, and in particular to a main body of an automotive winch for lashing and securing cargoes during truck transportation and an automotive winch for vehicle thereof.

DESCRIPTION OF THE PRIOR ART

An automotive winch is mounted on a side of a truck (for example, the carriage floor beam) to lash and secure cargoes together with a belt.

Figure 16:
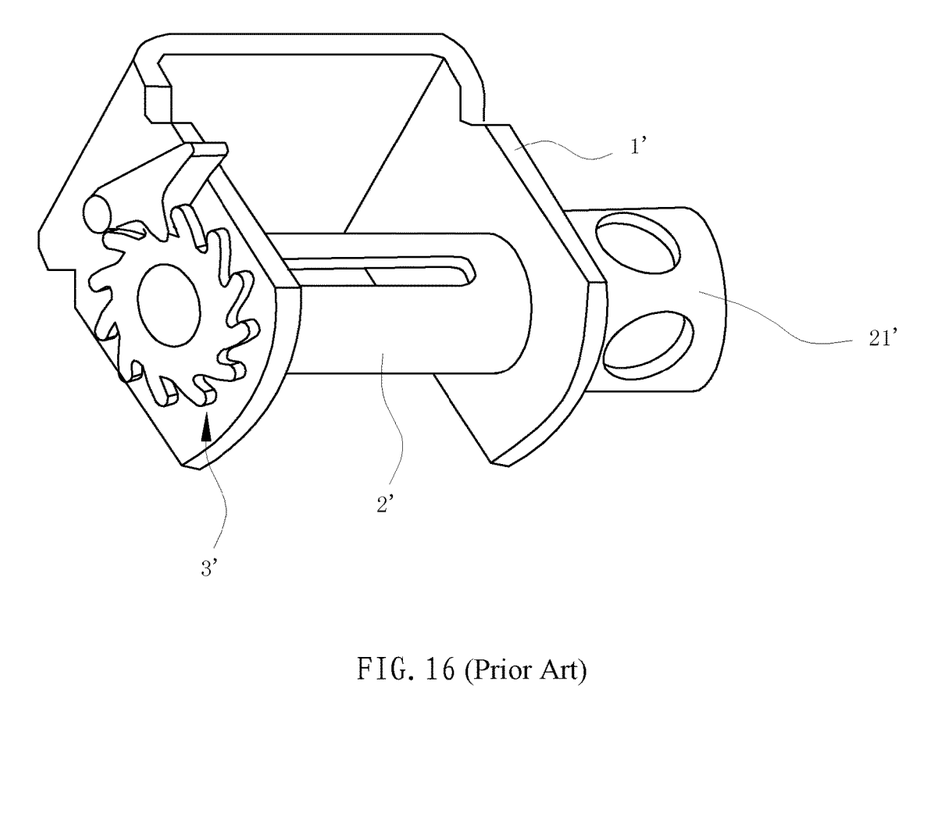
FIG. 16 is a perspective view of a conventional winch.

Usually, a winch comprises a U-shaped support 1', a rotating shaft 2', a ratchet mechanism 3', a crowbar, etc., as shown in FIG. 16. When in use, an end of the belt having a hook is fixed to the other side of the truck while a free end of the belt is passed into the rotating shaft 2' of the winch. A force is applied to an exterior extension portion 21' of the rotating shaft 2' by the crowbar. The rotating shaft 2' is driven to rotate directly by the force applied by the crowbar, the belt is thus tightened so that the cargoes are lashed and secured. And, the ratchet mechanism can prevent the rotating shaft from rotating reversely, in order to maintain the tension in the belt. During the practical operation, since the winch is fixed to the truck body and restricted in position, for a conventional winch, the crowbar has to be taken down after each prying of the winch and is then inserted into the winch for the next prying action. This process will be repeated several times to tighten the belt. Thus, it is inconvenient. Furthermore, the crowbar is long, and may thus rebound and hurt the operator if the force applied by the operator is not enough. It is even more troublesome for tension release during which the crowbar and the ratchet mechanism need to be operated simultaneously by two persons or by both hands of one person. There is high risk of safety hazards. For example, CN2885455Y disclosed a "cargo lashing machine for trucks" and CN202593358U disclosed a "cargo lashing euphroe for trucks", both of which have the shortcomings as described above.

And, for example, CN1664410A disclosed a "rotating mechanism for a belt axle of a winch". The rotating mechanism is arranged at the protrusion end of the belt axle on the side of the support of the winch, and a ratchet is fixedly connected to the belt axle at the protrusion end of the belt axle. This mechanism comprises a handle, a first pawl (retaining pawl) and a second pawl (retaining pawl). A first spring is provided between the first pawl and the support. By the first spring, the front end of the first pawl is embedded into teeth of the ratchet. An end of the handle is sleeved on the belt axle. The second pawl is hinged with the handle. A second spring is provided between the second pawl and the handle. By the second spring, the front end of the second pawl is embedded into teeth of the ratchet. When in use, the belt is tightened by turning the handle to and fro. In this mechanism, the crowbar for common winches is replaced with the handle. However, the main problem is that the operation is quite time-consuming and effort-consuming and thus low in efficiency because the handle directly drives the ratchet on the belt axle by the second pawl on the handle to drive the belt axle to rotate, and it is likely to result in slippage during the operation of the handle due to the infirm connection between the handle and the belt axle. And, with such a rotating mechanism, both the belt assembly and the belt disassembly are troublesome. Therefore, this rotating mechanism for a belt axle also has many shortcomings.

SUMMARY OF THE INVENTION

A first technical problem to be solved in the present invention is to, in view of the shortcomings in the prior art, provide a uniquely-designed and rationally-structured main body of an automotive winch, which is used in accompany with a manipulating handle, and by which the lashing operation of the winch will be more convenient and safe, time-saving and less effort-consuming and the operating efficiency will be greatly improved.

A second technical problem to be solved in the present invention is to provide an automotive winch for vehicle using the main body.

To solve the first technical problem, the main body of an automotive winch, comprises a main frame; a main rotating shaft disposed on the main frame for winding a belt; wherein a driving shaft for driving the main rotating shaft is disposed on the main frame; a transmission assembly engages the driving shaft and the main rotating shaft, the transmission assembly comprises a small gear disposed on the driving shaft and a large gear disposed on the main rotating shaft; a pair of ratchets spaced by the small gear is disposed on the driving shaft; a retaining pawl engaging on the pair of ratchets is disposed on the main frame; retaining pawl spring surrounds the retaining pawl, and the retaining pawl locks the pair of ratchets when driven by the retaining pawl spring.

To solve the second technical problem, the automotive winch for a vehicle, comprises a winch main body; and a manipulating handle removably mounted on the winch main body; a driving shaft mounted on the winch main body; a pair of ratchets assembled on the driving shaft; a driving pawl movably connected to the manipulating handle; a driving spring pushing the driving pawl against the pair of ratchets; wherein, the manipulating handle is detachably connected to the driving shaft; the driving pawl engages the pair of ratchets; and the pair of ratchets drives the driving shaft to rotate when pushed by the driving pawl.

Preferably, the winch main body further comprises a belt tightening region and a belt releasing region, and a release groove for the trapping of the driving pawl; a cam-like front portion which can facilitate the disengagement of the retaining pawl from the pair of ratchets is formed on the manipulating handle.

Preferably, in addition to the driving pawl and the driving spring, the manipulating handle further comprises a left wall and a right wall, each left wall and right wall defining a socket on their top portions, a pull member and a lock catch are disposed between the left wall and the right wall, the pull member and the lock catch are movable relative to the socket; the cam-like front portion is formed on a hooked top portions of each of the left wall and right wall; the left and right lateral walls are connected through a connecting shaft and a grip; two slippage slots through which two lateral extension portions of the driving pawl pass are formed on the left and right lateral walls; a pull member is disposed between the left and right lateral walls; the driving pawl and the driving spring are connected to the pull member; the lock catch is rotatably disposed between the left and right lateral walls and linked with the movement of the driving pawl by a linkage structure.

Preferably, a left plate and a right plate are disposed on the lock catch, the tops of the left and right plates are integrally connected; front portions of the left and right plates are shaped like a tongue corresponding to the sockets on the left and right lateral walls; a notch, from which two lateral extension portions of the driving pawl are exposed, is formed correspondingly on each of the left and right plates; a shaft hole for mounting a lock shaft is formed above the notch and near the rear end of the notch; the lock catch is pivotally connected to the left and right lateral sheets by the lock shaft.

Preferably, the main frame of the winch main body is of an inverted U-shaped structure; a spacer which is parallel to the left and right plates is provided in the interior of the main frame, by which the main rotating shaft arranged between the left and right plates is partitioned into a belt segment located between the left plate and the spacer and an operating segment located between the spacer and the right plate, and the large gear is arranged in the operating region; holes, defined on the spacer and the right wall, for receiving the driving shaft and the retaining pawl; a barrier plate disposed at the rear of the spacer and the right plate, the barrier plate defining a through-hole; a bolt of a rear portion of the retaining pawl extending through through-hole; a retaining pawl spring being sleeved onto the rear portion of the retaining pawl; the driving spring rests against the barrier plate and the retaining pawl.

Preferably, two release grooves for trapping the driving pawl are recesses respectively formed on a lower edge of the front side of the spacer and a lower edge of the front side of the right plate; a belt tightening region and a belt releasing region are a segment of concave-convex edge below the recesses; a gap which is convenient for the insertion of a manipulating handle socket is reserved between the pair of ratchets fixed on the driving shaft and their respective spacers and right plates.

Compared with the prior art, the present invention has the following advantages. The design is unique and rational, specifically: the winch main body and the manipulating handle are detachably assembled together and the firm connection between them avoids disengagement and injury to persons, leading to easy operation and high safety. The layout of the main body is rational. When in use, the belt region and the operating region of the main body will not interfere with each other. Furthermore, the size of the main body will not increase as the operating region increases. A gear transmission mechanism is provided in the main body so that a large lashing tension will be obtained by applying a small force by a hand. Moreover, the belt can be tightened just by pulling the handle to and fro, without repeatedly mounting and dismounting the handle (crowbar), thereby both time-saving and effort-saving.

DETAILED DESCRIPTION OF THE PREFERRED EMBODIMENT

To enable a further understanding of the present invention content of the invention herein, refer to the detailed description of the invention and the accompanying drawings below:

In this embodiment, an automotive winch for a vehicle using a winch main body of the present invention will be described as an example. Specifically, as shown in FIGS. 1-15, the winch mainly comprises a winch main body 111 and a manipulating handle 222 removably mounted on the winch main body 111, which are independent of each other and also can be assembled together by a unique structure. The conventional crowbar is completely replaced with the manipulating handle to finish the lashing operation. In this way, it is really convenient, safe, and both time-saving and effort-saving.

The main body of an automotive winch is shown in FIGS. 6-9. The main body comprises a main frame 1, a main rotating shaft 2 disposed on the main frame 1 for winding a belt 16, a large gear 3, a small gear 4, a driving shaft 6, a pair of ratchets 5, a retaining pawl 13, a retaining pawl spring 14, etc.

Wherein the main frame 1 has a U-shape with a left plate and a right plate 101,103; a spacer 102 parallel to the left plate and the right plate 101,103 is attached to the main frame 1; the main rotating shaft 2 is partitioned into a belt segment 1a located between the left plate 101 and the spacer 102 and an operating segment 1b located between the spacer 102 and the right plate 103; a main rotating shaft hole in which a main rotating shaft 2 is mounted is formed on each of the left and right plates 101, 103 and the spacer 102; the structure of the spacer 102 is the same as that of the right plate 103; in addition to the main rotating shaft holes, driving shaft holes is defined on the spacer 102 and the right wall 103, for receiving the driving shaft 6 the; a retaining pawl slippage hole into which a lateral extension portion of a retaining pawl 13 can be inserted is formed behind the driving shaft hole; one recess 1e (release groove) is formed on a front side of the spacer 102 and another recess 1e is formed on a front side of the right plate 103, and during the release operation, a driving pawl 20 on the manipulating handle 222 can be trapped into the groove; a belt tightening region 1c (the concave segment) and a belt releasing region 1d (the convex segment, next to the groove 1e) are a segment of concave-convex edge below the recesses 1e.

The main rotating shaft 2 consists of two semi-circular shafts, and is rotatably arranged in the main rotating shaft hole; the main rotating shaft 2 is partitioned into a belt segment 1a located between the left plate 101 and the spacer 102, onto which the belt 16 is wound, and an operating segment 1b located between the spacer 102 and the right plate 103; the large gear 3 is disposed in the operating region 1b.

The large gear 3 has two semi-circular holes through which the two semi-circular shafts pass; the large gear 3 is disposed in the operating region 1b of the main rotating shaft 2, and limited and fixed by a stop collar 11 arranged on its two sides; after the main rotating shaft 2 on which the large gear 3 is mounted is assembled on the main frame 1, the two ends of the main rotating shaft 2 are assembled and limited by a pad 12 and a pin 10. As desired, a rocker can be connected to an end of the main rotating shaft 2 on the left plate 101. The rocker is rocked to drive the main rotating shaft 2 to rotate.

The driving shaft 6 is a non-circular shaft on which the pair of ratchets 5 having the same structure and one small gear 4 are disposed; the driving shaft 6 is rotatably arranged in the driving shaft hole by shaft sleeves 7, the pad 8 and the pin 9.

The small gear 4 is disposed on the driving shaft 6 to be engaged with the large gear 3 on the main rotating shaft 2; the small gear 4 is, in the radial direction, limited by coordinating with the driving shaft 6 by the non-circular hole on the small gear 4, and while in the axial direction, limited by the pair of ratchets 5 on the two sides of the small gear 4.

There are two ratchets 5 having the same structure, which are disposed on the two sides of the small gear 4 on the driving shaft 6; the pair of ratchets 5 is, in the radial direction and similarly to the small gear 4, limited by coordinating with the driving shaft 6 by the non-circular hole, while in the axial direction, respectively limited by a shaft sleeve 7; furthermore, the two ratchets 5 are separated from their respective spacers 102 and right plates 103 by the shaft sleeves 7, so that a gap which is convenient for insertion of a manipulating handle socket 17a s reserved on the outer side of each ratchet.

After being inserted into the slippage slot on the spacer 102 and the right plate 103 by the two lateral extension portions, the retaining pawl 13 is obliquely and upward mounted on the main frame 1, with its upward end facing the driving shaft 6, so as to coordinate with the pair of ratchets 5 on the driving shaft 6; a barrier plate 15 is disposed at the rear of the spacer 102 and the right plate 103, the barrier plate 15 defining a through-hole; a bolt extends from a rear portion of the retaining pawl 13 into the through-hole.

As the retaining pawl spring 14, a compression spring is used; the retaining pawl spring 14 is sleeved onto the bolt of the rear portion of the retaining pawl 13, with its two ends respectively resisted against the retaining pawl 13 and the barrier plate 15; the retaining pawl 13 always approaches to the pair of ratchets 5 due to the effect of the retaining pawl spring 14. At the end of cargo lashing, the retaining pawl 13 is engaged with teeth of the pair of ratchets 5 to avoid the inverse rotation of the pair of ratchets 5, so that the belt 16 can be kept in a certain tension for lashing and securing cargoes.

Figure 6:
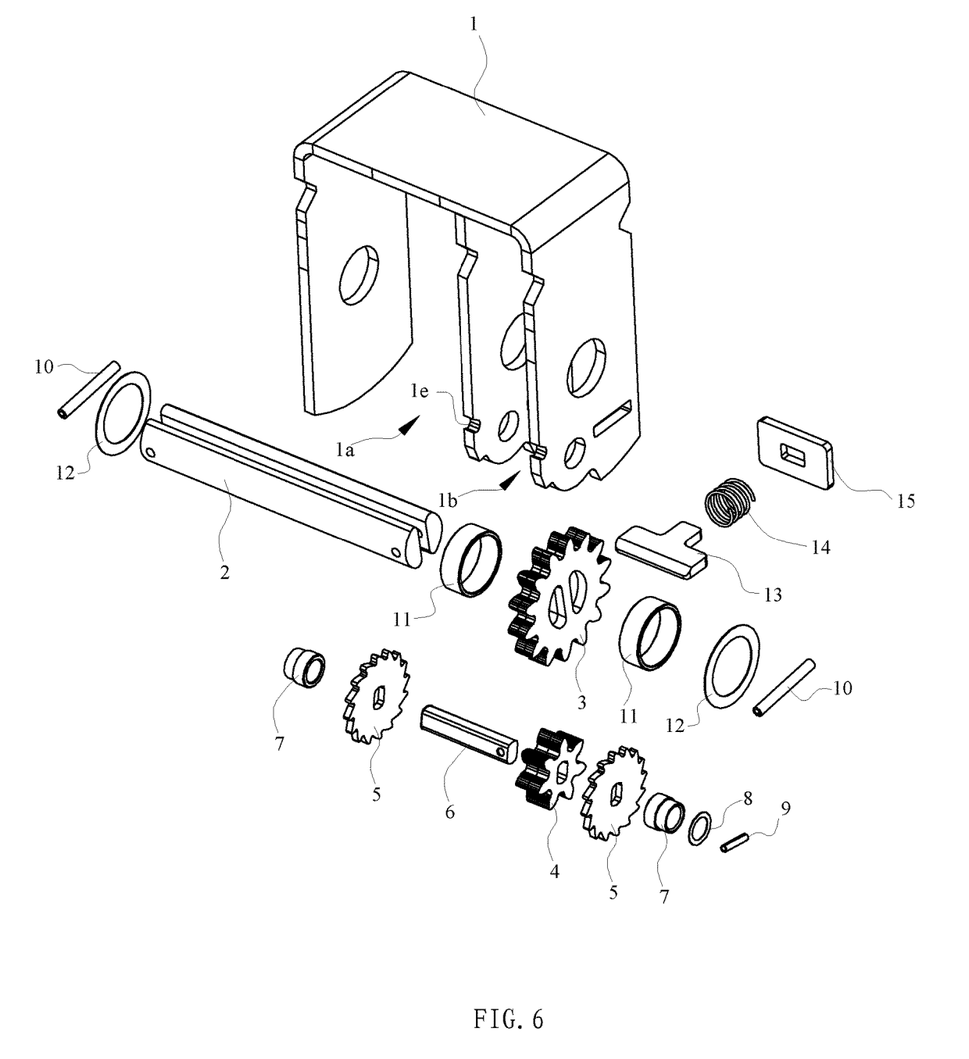
FIG. 6 is an exploded view of the a winch main body according to the embodiment of the present invention.
Figure 7:
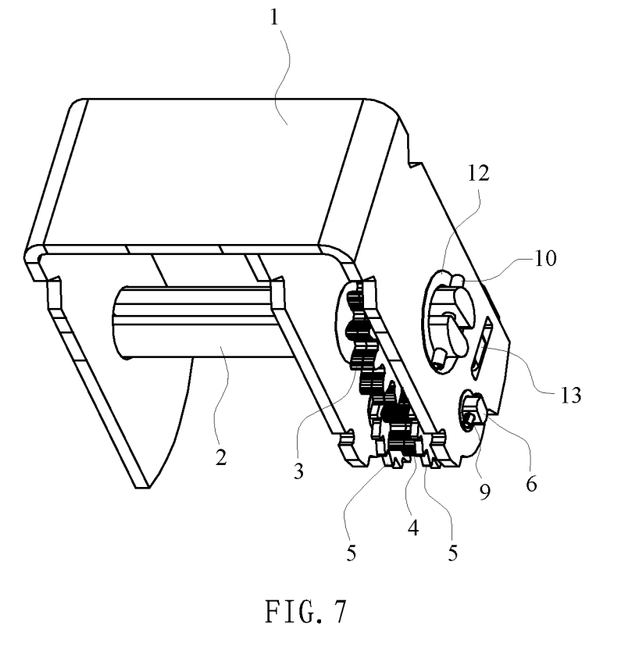
FIG. 7 is another perspective view of the winch main body according to the embodiment of the present invention.
Figure 8:
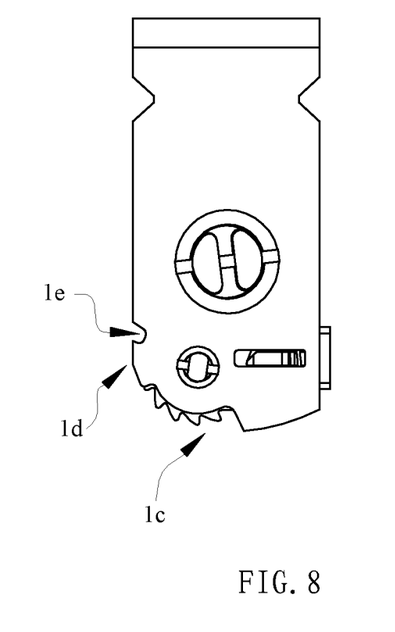
FIG. 8 is a side view of the winch main body according to the embodiment of the present invention.
Figure 9:
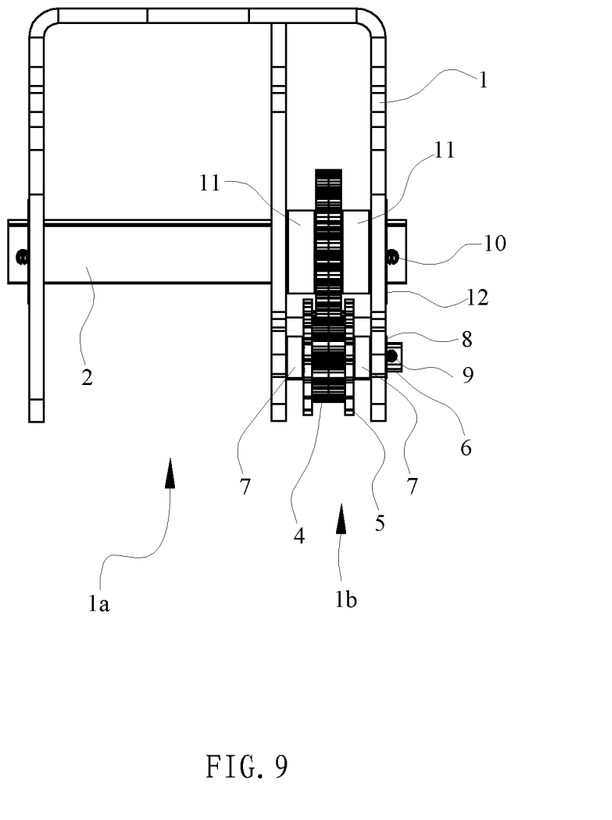
FIG. 9 is a front view of the winch main body according to the embodiment of the present invention.
Figure 10:
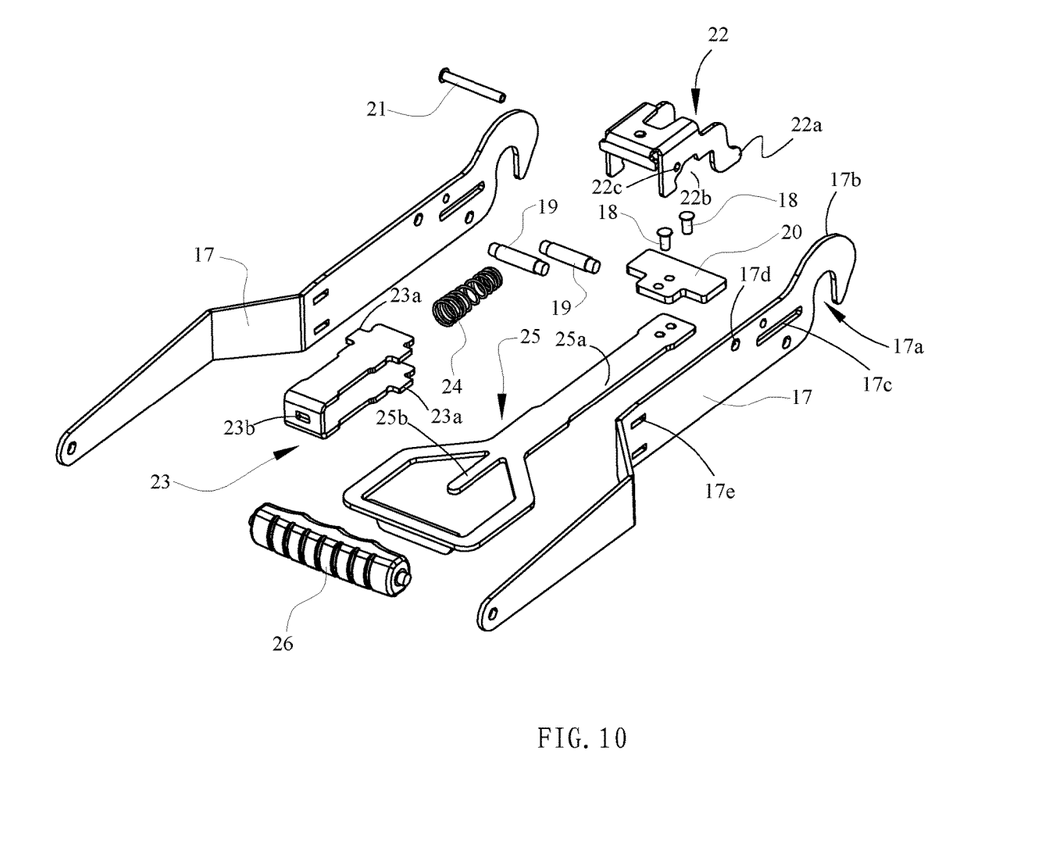
FIG. 10 is an exploded view of the manipulating handle according to the embodiment of the present invention.
Figure 11:
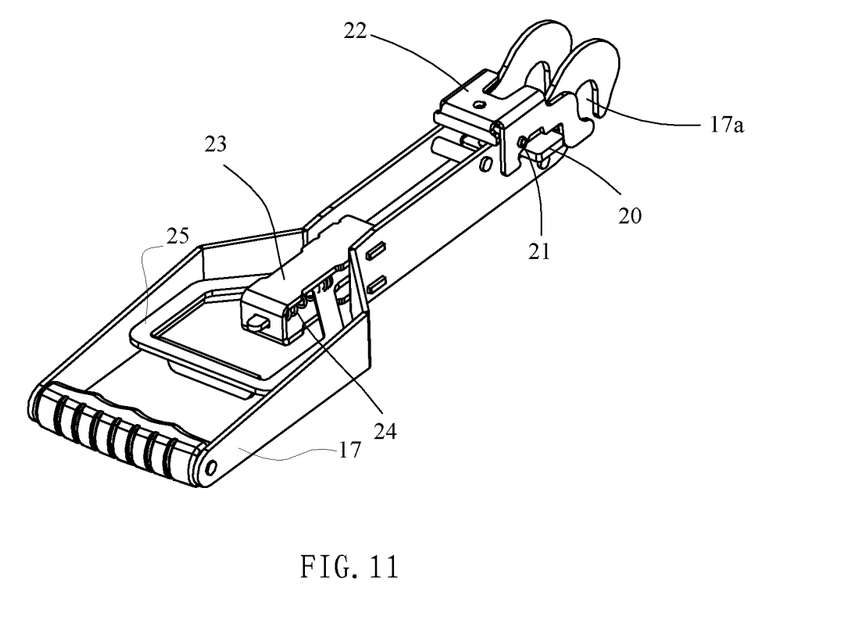
FIG. 11 is a perspective view of the manipulating handle according to the embodiment of the present invention.
Figure 12:
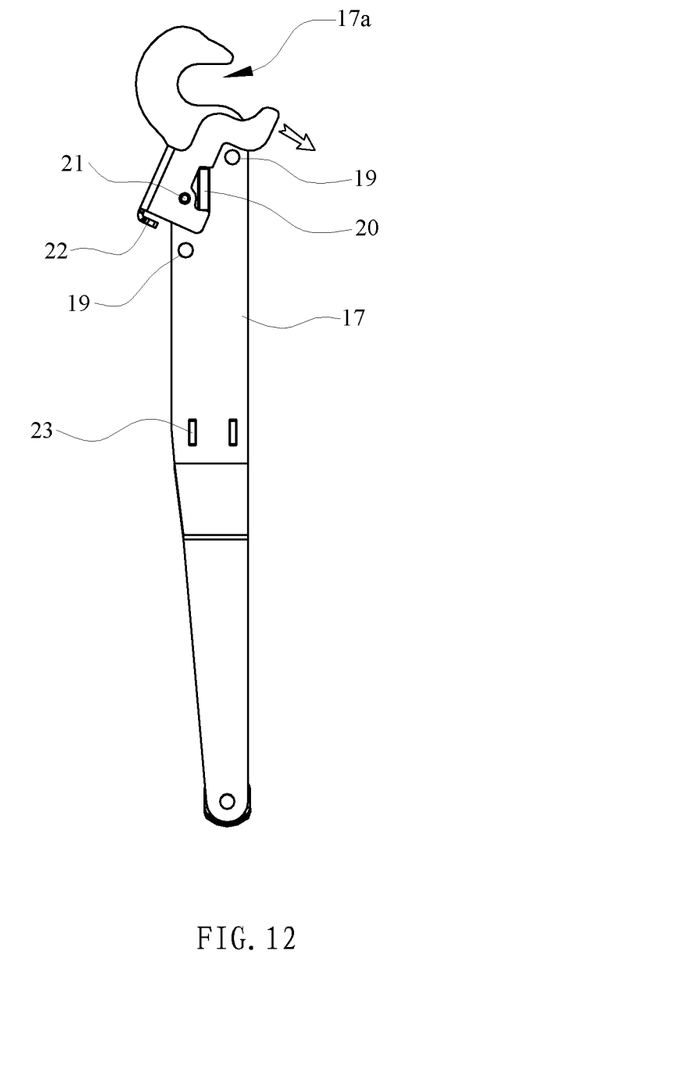
FIG. 12 is a perspective view of the manipulating handle according to the embodiment of the present invention, when the lock catch is opened.
Figure 13:
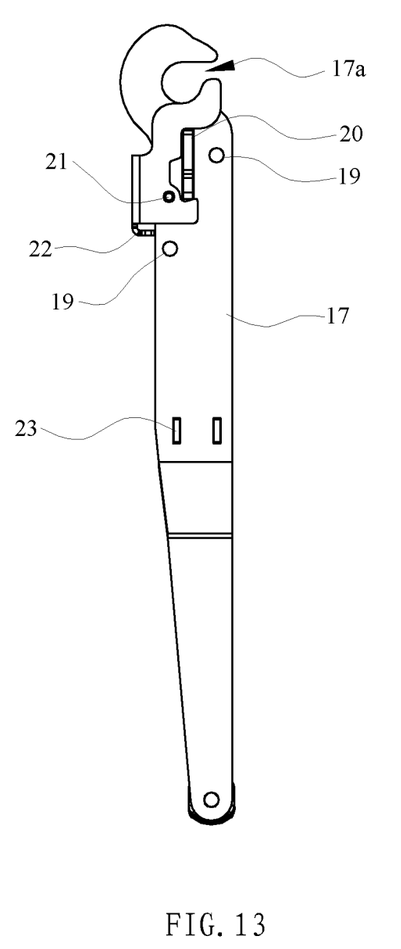
FIG. 13 is a side view of the manipulating handle according to the embodiment of the present invention.
Figure 14:
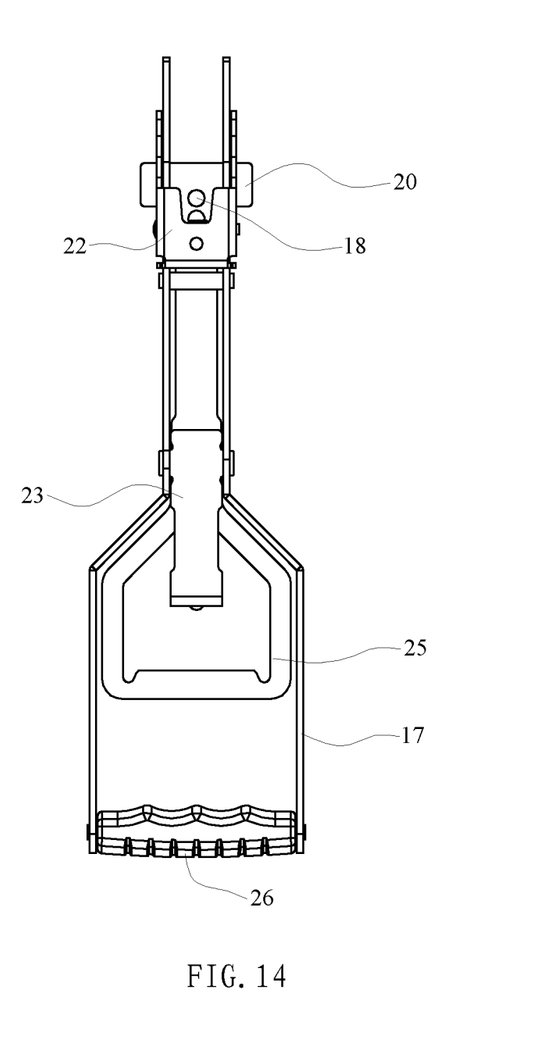
FIG. 14 is a front view of the manipulating handle according to the embodiment of the present invention.
Figure 15:
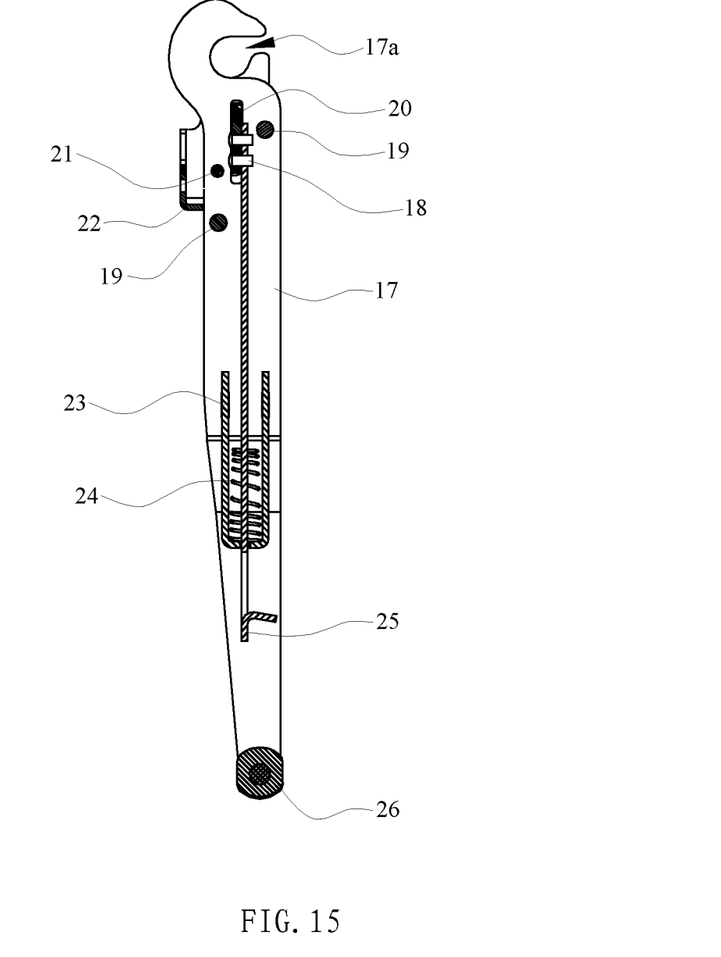
FIG. 15 is a sectional view of the manipulating handle according to the embodiment of the present invention.

The main body of an automotive winch assembled by components as described above is rational in structure. When in use, the belt region and the operating region will not interfere with each other. Furthermore, the size of the main body will not increase as the operating region increases. There is no any shaft segment or ratchet or pawl exposed (as shown in FIG. 6, an end of the spool of a conventional winch to which the crowbar can be connected is protruded from the plates, and the ratchets and pawls are mounted on the spool and exposed). And, a transmission assembly engages the driving shaft and the main rotating shaft. In this way, by applying a small driving force to the driving shaft, and through the transmission of the transmission assembly to the main rotating shaft, the main rotating shaft can obtain a great acting force. In other words, the belt obtains a great lashing force. Therefore, it is very effort-saving. The transmission assembly in this embodiment is a gear pair (a small driving gear and a large driven gear). However, as desired, multi-stage gear pairs can be used to obtain a greater transmission ratio.

The structure of the manipulating handle 222 is shown in FIGS. 10-15. The manipulating handle 22 mainly comprises a left wall and a right wall 17 for the handle, a pull member 25, a fixing holder 23, a lock catch 22, a driving pawl 20, a driving spring 24, etc.

The left wall and right wall 17 have the same structure, and are assembled together with a connecting shaft 19 in the front portion by a grip 26 in the tail end; the head portions of the left wall and right wall 17 look like a hook defining a socket 17a which is open downward; the cam-like front portion is formed on a hooked top portions of each of the left wall and right wall 17; when the belt is to be released, the retaining pawl 13 can be lifted off by the cam-like front portion to disengage the retaining pawl 13 from the ratchets 5; in addition, two slippage slots 17c through which the two lateral extension portions of the driving pawl 20 pass, a lock catch shaft hole 17d in which a lock catch shaft 21 is mounted, and a through hole 17e through which a lateral extension portion 23a of the fixing holder 23 passes are formed on the left and right walls 17 at positions close to the socket 17a.

The driving pawl 20 coordinates with the pair of ratchets 5 on the winch main body; the driving pawl 20 is disposed between the left wall and the right wall 17 and connected to the pull member 25; specifically, the two lateral extension portions of the driving pawl 20 are inserted into the slippage slot 17c on the left wall and the right wall 17, and an extension pin in the rear portion is fixed to the front end of the pull member 25 by rivets 18; after well mounted, the driving pawl 20 is obliquely and downward located, with its front end facing downward.

The pull member 25 is disposed between the left and right walls 17, with its annular pull portion extending forward to form a long flat bar 25a; the driving pawl 20 is formed on the front end of the bar; the tail end of the bar extends toward the interior of the annular pull portion to form a stripped bolt 25b on which the driving spring 24 is arranged.

The fixing holder 23 is used for fixing the driving spring 24; the fixing holder 23 has an upper sheet, a lower sheet and a lateral sheet; the upper sheet and the lower sheet are parallel to each other, have the same structure, and are integrally connected to the lateral sheets; two lateral extension portions 23a, which are formed by extending outward, are formed on the two sides of the upper sheet and the lower sheet. The lateral extension portions 23a can be inserted into the through hole 17e on the left and right walls 17 of the handle; a bolt hole 23b, through which the bolt 25b on the pull member 25 passes, is formed on the lateral sheet.

The driving spring 24 is a compression spring sleeved on a bolt 25b on the pull member 25, with one end resisted against the lateral sheet of the fixing holder 23 while the other end resisted against the pull member 25; during the assembly, the driving spring 24 is sleeved on the bolt 25b, the fixing holder 23 is then mounted, the bolt 25b on the pull member is passed through the bolt hole 23a on the fixing holder, and the lateral extension portions on the upper sheet and the lower sheet are inserted into the through hole 17e on the left and right walls 17 of the handle; after the driving spring 24 is well mounted, the pull member 25 and the driving pawl 20 on the pull member always approach to an end of the socket 17a due to the spring force.; only when the pull member 25 is pulled backward, the driving pawl 20 will move backward together with the pull member 25. When the pull member 25 is released, the pull member 25 and the driving pawl 20 will return to the original position due to the effect of the driving spring 24.

A left plate and a right plate 101,103 are disposed on the lock catch 22; front portions 22a of the left and right plates 101,103 are shaped like a tongue corresponding to the sockets 17a on the left and right walls 17; a notch 22b, from which the two lateral extension portions of the driving pawl 20 are exposed, is formed correspondingly on each of the left and right plates 101,103; a shaft hole 22c for mounting a lock shaft 21 is formed above the notch 22b and near the rear end of the notch 22b; the lock catch 22 is pivotally connected to the left and right walls 17 by the lock shaft 21, and is rotatable around the lock shaft 21; the notch 22b, the lock shaft 21 and the like form a linkage structure which moves together with the driving pawl 20.

The working principle of the manipulating handle formed by the components described above is as follows: the pull member 25 is pulled backward, the backward pulling of the pull member 25 drives the driving pawl 20 to move backward until the driving pawl 20 comes into contact with the rear wall of the notch 22b of the lock catch, the lock catch 22 can be driven to deflect so that the tongue-like front portion 22a of the lock catch faces downward, and now the socket 17a is the open state; after the pull member 25 is released, the pull member 25 and the driving pawl 20 move forward together and return to the original position due to the spring force, the lock catch 22 also returns to the original position (the driving pawl comes into contact with the front wall of the notch) because of being free from the driving pawl 20, the tongue-like front portion 22a returns to the original state, and now the socket 17a is in the closed state. Therefore, with regard to the manipulating handle of the present invention, the socket 17a is opened or closed skillfully by the linkage of the driving pawl 20 and the lock catch 22, and the operation is thus very easy. The manipulating handle of the present invention thus has a function of being detachably connectable to the winch main body and a function of driving the main body to operate.

Still referring to FIGS. 2-5, the dynamic use process of the whole winch will be described then.

Figure 1:
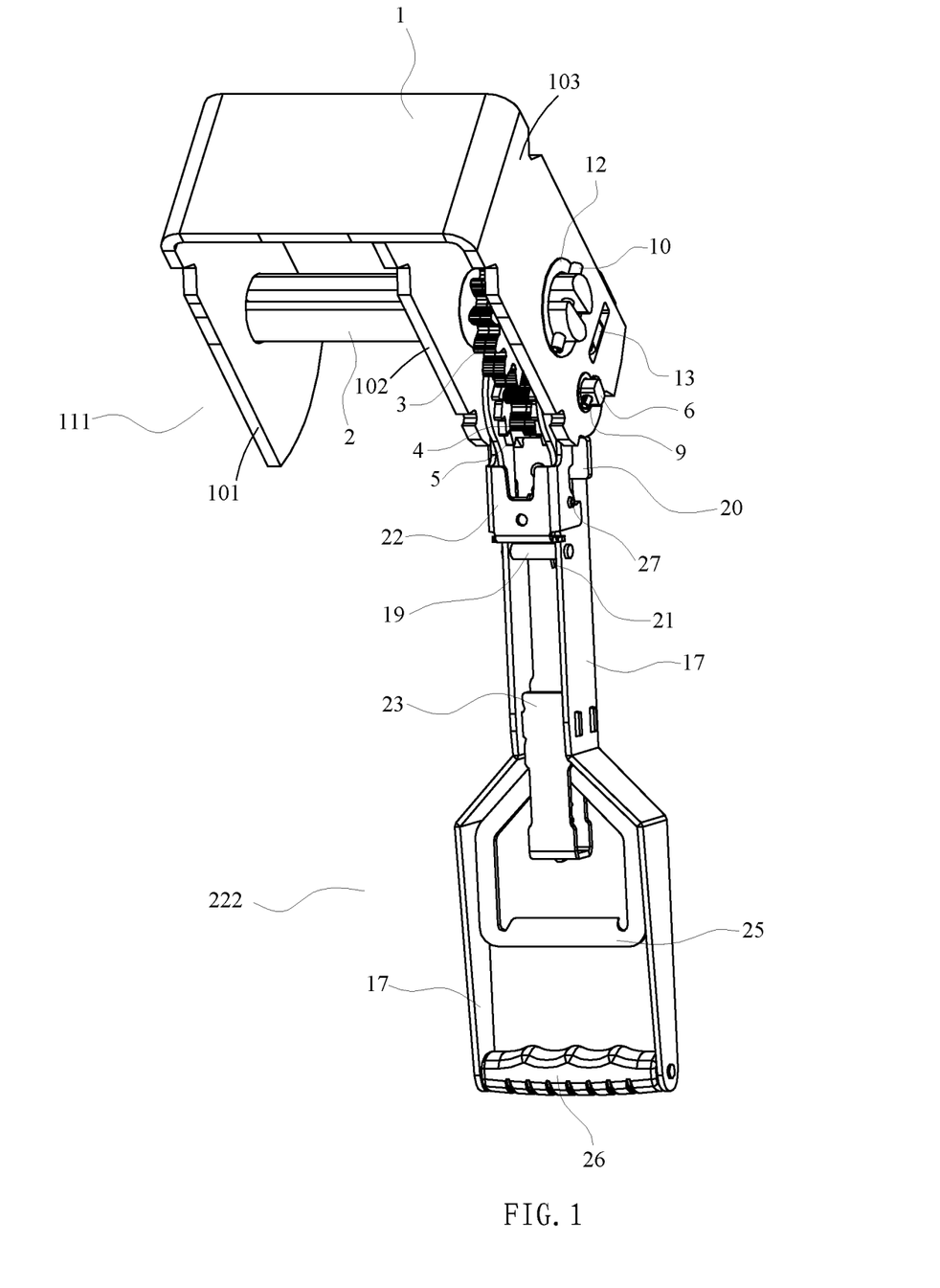
FIG. 1 is a perspective view of an automotive winch for a vehicle according to an embodiment of the present invention.
Figure 2A:
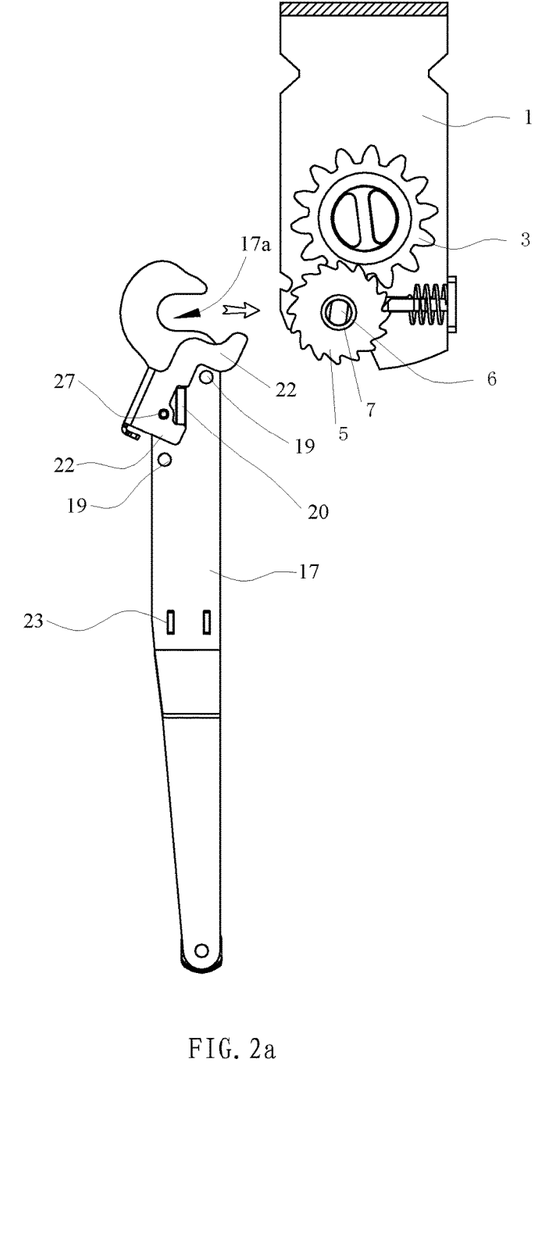
FIG. 2a is a schematic view of a winch main body before the main body is connected with a manipulating handle according to the embodiment of the present invention.

When it is not in use, the manipulating handle 222 and the winch main body 111 are separated.

Figure 2B:
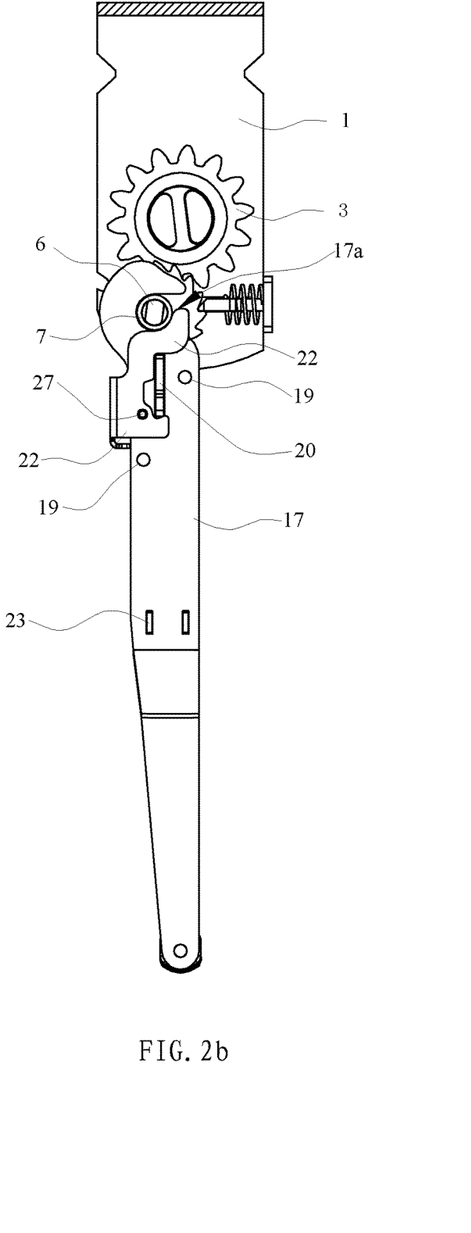
FIG. 2b is a schematic view of the winch main body after the main body is connected with the manipulating handle according to the embodiment of the present invention.

When in use, first, the manipulating handle 222 is connected to the driving shaft 6. That is, the pull member 25 is pulled backward so that the socket 17a is opened; and then the socket 17a is aligned and inserted to a gap between the two ratchets, the spacer and the right lateral sheet. In this way, the socket 17a is sleeved on the shaft sleeve 7. Then, the pull member 25 is released and the lock catch 22 returns to the original position. Now, the whole manipulating handle 222 is well connected to winch the main body 111, as shown in FIG. 2. The firm connection between the manipulating handle and the main body avoids disengagement and injury to persons, leading to high safety.

Figure 3:
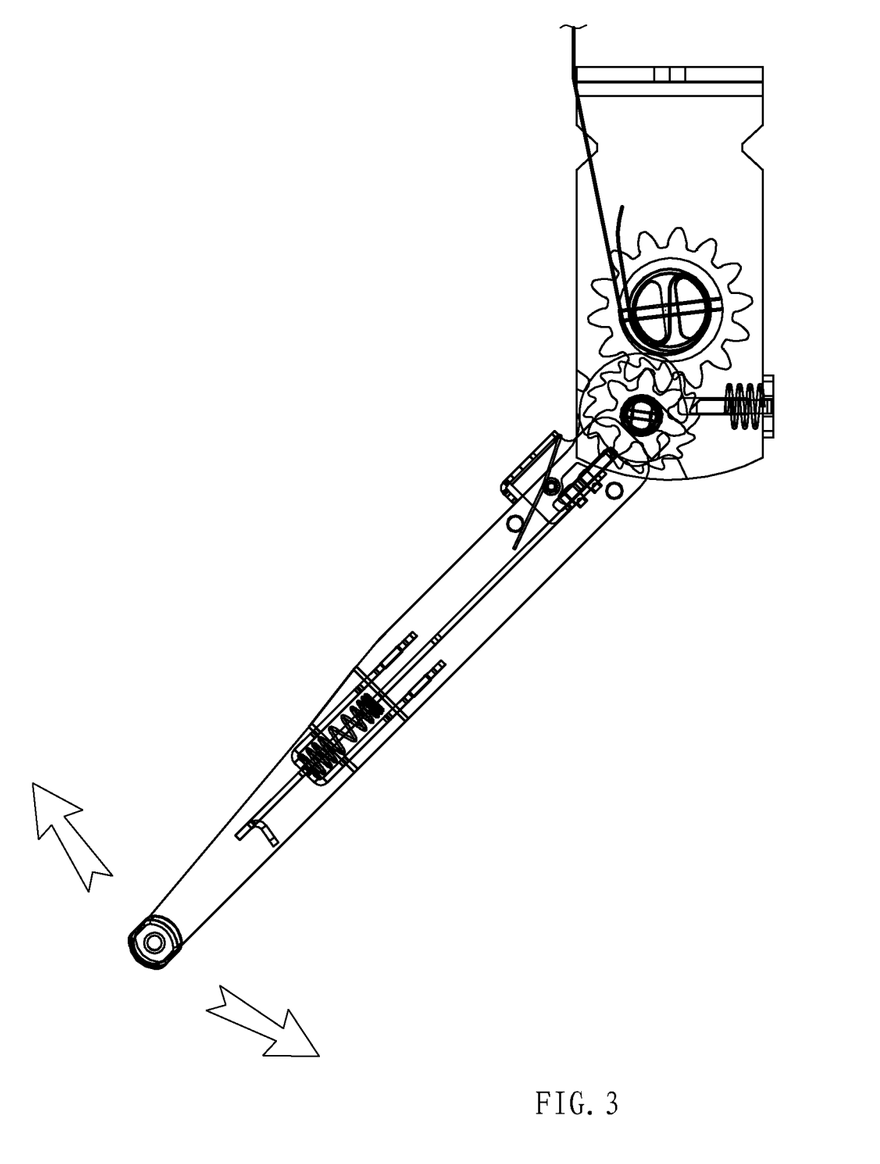
FIG. 3 is a schematic view of the automotive winch for a vehicle according to the embodiment of the present invention, showing how the winch is tightened.

At the end of connection, when the driving pawl 20 is located in the belt tightening region 1c, the manipulating handle is rocked repeatedly. Now, the driving pawl 20 drives the ratchets 5 to rotate, the rotation of the ratchets 5 drives the driving shaft 6 and the small gear 4 to rotate together, and then the small gear 4 drives the large gear 3 which is engaged with the small gear 4 and the main rotating shaft 2 to tighten the belt 16. Gear transmission is employed in the main body so that a large lashing tension will be obtained by applying a small force by a hand. Moreover, the belt can be tightened just by pulling the handle to and fro, without repeatedly mounting and dismounting the handle (crowbar), thereby both time-saving and effort-saving.

At the end of operation, the retaining pawl 13 is engaged with the teeth on the ratchets 5, and the ratchets 5 do not rotate.

Figure 4:
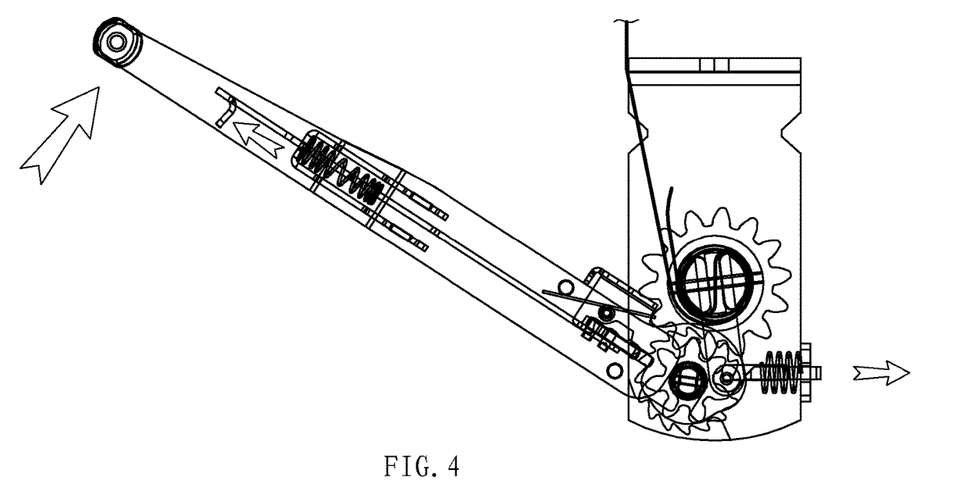
FIG. 4 is a schematic view of the automotive winch for a vehicle according to the embodiment of the present invention, showing how the winch is released.
Figure 5:
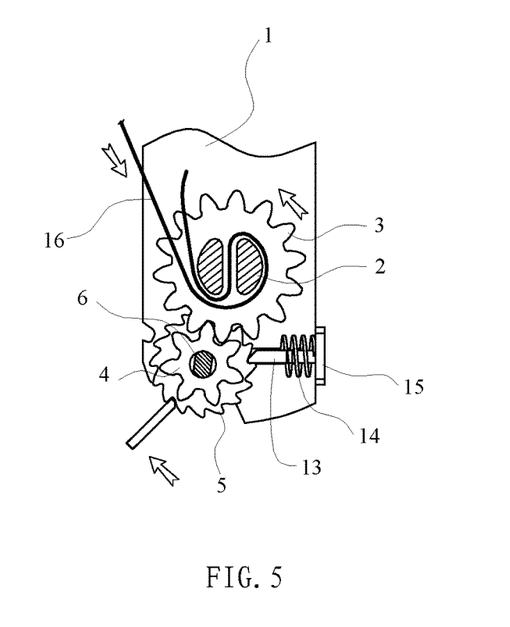
FIG. 5 is a schematic view of the working principle of the automotive winch according to the embodiment of the present invention.

When the tension on the belt 16 is to be released, the driving pawl 20 is trapped in the release groove 1e, and the retaining pawl 13 is lifted off by the cam-like front portion of the handle so that the two ratchets 5 are disengaged from the retaining pawl 13. In this way, inverse rotation can be realized. Now, the pair of ratchets 5, the driving shaft 6, the large and small gears 3, 4, and the main rotating shaft are able to rotate freely. In this way, the tension on the belt 16 is released. The whole tightening and releasing action can be realized by a single person, without requiring two hands or two persons. Therefore, the operation is quite convenient.

When the manipulating handle 222 is to be detached, the pull member 25 is pulled, the socket 17a is opened, the handle 222 is taken out and separated from the winch main body 111, and now the winch main body 111 is now in the operating state.

The invention claimed is:
1. A main body of an automotive winch, comprising:
a main frame;
a main rotating shaft disposed on the main frame for winding a belt;
wherein
a driving shaft for driving the main rotating shaft is disposed on the main frame;
a transmission assembly engages the driving shaft and the main rotating shaft, the transmission assembly comprises a small gear disposed on the driving shaft and a large gear disposed on the main rotating shaft;
a pair of ratchets spaced by the small gear is disposed on the driving shaft;
a retaining pawl engaging on the pair of ratchets is disposed on the main frame; and
a retaining pawl spring surrounding the retaining pawl, and the retaining pawl locking the pair of ratchets when driven by the retaining pawl spring.

2. The main body of claim 1, wherein
the main frame has a U-shape with a left plate and a right plate;
a spacer parallel to the left plate and the right plate is attached to the main frame;
the main rotating shaft is partitioned into a belt segment located between the left plate and the spacer and an operating segment located between the spacer and the right plate; and
the large gear is disposed in an operating region of the main frame.

3. The main body of claim 2, further comprising:
holes, defined on the spacer and the right plate, for receiving the driving shaft and the retaining pawl;
a barrier plate disposed behind the spacer and the right plate, the barrier plate defining a through-hole;
a rear portion of the retaining pawl extending through the through-hole;
the retaining pawl spring being sleeved onto the rear portion of the retaining pawl;
wherein a driving spring rests against the barrier plate and the retaining pawl.

4. The main body of any one of claims 2-3, wherein one recess is formed on a front side of the spacer and another recess is formed on a front side of the right plate.

5. An automotive winch for a vehicle, comprising:
a winch main body;
a manipulating handle removably mounted on the winch main body;
a driving shaft mounted on the winch main body;
a pair of ratchets assembled on the driving shaft;
a retaining pawl obliquely mounted on the winch main body and engaged to the pair of ratchets;
a driving pawl movably connected to the manipulating handle; and
a driving spring pushing the driving pawl against the pair of ratchets;
wherein,
the winch main body further comprises
a belt tightening region, and
a belt releasing region, and a release groove for the trapping of the driving pawl;
a front portion which can facilitate the disengagement of the retaining pawl from the pair of ratchets is formed on the manipulating handle;
the manipulating handle is detachably connected to the driving shaft;
the driving pawl engages the pair of ratchets; and
the pair of ratchets drives the driving shaft to rotate when pushed by the driving pawl.

6. The winch of claim 5, wherein
the manipulating handle further comprises a left wall and a right wall, each left wall and right wall defining a socket on their top portions, a pull member and a lock catch are disposed between the left wall and the right wall, the pull member and the lock catch are movable relative to the socket;
the front portion is formed on a hooked top portions of each of the left wall and right wall;
the left and right lateral walls are connected through a connecting shaft and a grip;
two slippage slots through which two lateral extension portions of the driving pawl pass are formed on the left and right walls;
the driving pawl and the driving spring are connected to the pull member;
the lock catch is rotatably disposed between the left and right lateral walls, and linked with the movement of the driving pawl by a linkage structure.

7. The winch of claim 6, wherein
a left plate and a right plate each having a top are disposed on the lock catch, the tops of the left and right plates are integrally connected;
front portions of the left and right plates are shaped like a tongue corresponding to the sockets on the left and right lateral walls;
a notch, from which the two lateral extension portions of the driving pawl are exposed, is formed correspondingly on each of the left and right plates;
a shaft hole for mounting a lock shaft is formed above the notch and near a rear end of the notch;
the lock catch is pivotally connected to the left wall and right wall of the manipulating handle by the lock shaft.

8. The winch of any one of claims 5, 6, or 7, wherein
the winch main body has a main frame having a U-shape with a left plate and a right plate;
a spacer parallel to the left plate and the right plate is attached to the main frame;
a main rotating shaft is partitioned into a belt segment located between the left plate and the spacer and an operating segment located between the spacer and the right plate; and
a large gear is disposed in the operating region;
holes, defined on the spacer and the right wall, for receiving the driving shaft and the retaining pawl;
a barrier plate disposed behind the spacer and the right plate, the barrier plate defining a through-hole;
a rear portion of the retaining pawl extending through the through-hole;
a retaining pawl spring being sleeved onto the rear portion of the retaining pawl;
the driving spring rests against the barrier plate and the retaining pawl.

9. The winch of claim 8, wherein
two release grooves for trapping the driving pawl are recesses respectively formed on a lower edge of a front side of the spacer and a lower edge of a front side of the right plate;
the belt tightening region and the belt releasing region are a segment of concave-convex edge below the recesses;
a gap formed for the insertion of a manipulating handle socket is reserved between the pair of ratchets fixed on the driving shaft and their respective spacers and right plates.

* * * * *